United States Patent [19]
Ruefer

[11] Patent Number: 6,162,885
[45] Date of Patent: *Dec. 19, 2000

[54] MULTI-AXIALLY ORIENTATED AMORPHOUS PTFE MATERIAL

[76] Inventor: Bruce G. Ruefer, 1700 Park View La., Bozeman, Mont. 59715-8378

[ * ] Notice: This patent issued on a continued prosecution application filed under 37 CFR 1.53(d), and is subject to the twenty year patent term provisions of 35 U.S.C. 154(a)(2).

[21] Appl. No.: 08/862,551

[22] Filed: May 23, 1997

[51] Int. Cl.[7] ...................................................... C08F 14/18
[52] U.S. Cl. ............................................................ 526/255
[58] Field of Search .............................................. 526/255

[56] References Cited

U.S. PATENT DOCUMENTS

| | | |
|---|---|---|
| 3,953,566 | 4/1976 | Gore . |
| 4,385,093 | 5/1983 | Hubis . |
| 4,478,665 | 10/1984 | Hubis . |
| 4,482,516 | 11/1984 | Bowman et al. . |
| 4,650,833 | 3/1987 | Sakagami et al. ...................... 526/255 |
| 4,656,234 | 4/1987 | Murayama et al. ..................... 526/255 |
| 4,820,787 | 4/1989 | Kataoka et al. ........................ 526/255 |
| 4,824,898 | 4/1989 | Sukigara et al. ....................... 526/255 |
| 5,071,609 | 12/1991 | Tu et al. ................................. 526/255 |
| 5,420,191 | 5/1995 | Howard, Jr. et al. .................... 526/255 |

FOREIGN PATENT DOCUMENTS

| | | | |
|---|---|---|---|
| 2417901 | 1/1975 | Germany ................. | 526/255 |
| 0813331 | 5/1959 | United Kingdom .................. | 526/255 |
| 1017749 | 1/1966 | United Kingdom .................. | 526/255 |

OTHER PUBLICATIONS

Fortschr. Hochpolym.–Forsch Bd. 2, 5. 465–495 (1961) "Fluorine–Containing Polymers II Polytetrafluoroethylane." Sperati et al.

*Primary Examiner*—Bernard Lipman
*Assistant Examiner*—N. Sarofim
*Attorney, Agent, or Firm*—Shook, Hardy & Bacon L.L.P.

[57] ABSTRACT

The invention is an amorphous polytetrafluoroethylene or PTFE polymer that is composed of multi-axially oriented PTFE polymer chains. The multi-axial orientation allows the invention to exhibit consistent strength in more than one direction, exhibit excellent creep resistance, and exhibit flexural fatigue resistance.

2 Claims, 2 Drawing Sheets

MULTI-AXIALLY ORIENTATED AMORPHOUS PTFE MATERIAL

BACKGROUND OF THE INVENTION

The mechanical characteristics of polytetrafluoroethylene (PTFE) polymers effect its overall performance characteristics including resistance to creep, ultimate strength, and flexural properties. For the polymer engineer, two of the major design issues encountered during the development of PTFE polymers are the ultimate strength and strength bias or uniformity of the material. It is known by those skilled in polymer design that amorphous PTFE polymer exhibit a bias or nonuniform strength characteristic due to the uniaxial orientation of the PTFE polymer chains. Polymer engineers have attempted to overcome this problem by making the amorphous PTFE polymer more crystalline via high temperature sinterring methods. Sinterring renders the polymer stiff and prone to flexure fatigue. Engineers have addressed the problems of amorphous PTFE nonuniform strength or strength bias by constructing layers of uniaxially orientated amorphous PTFE polymers. Layering renders the polymer prone to delamination problems and may make the polymer bulky and resistant to bending.

Multi-axial strength may be attained by thermally treating and subsequently coalescing PTFE polymers. This process results with a high crystallinity rendering the material stiff and prone to fracture fatigue and flex-life problems. Several manufacturers have introduced an expanded version of PTFE polymer characterized by crystalline fibrils and nodes such that the problems of stiffness arid flexure fatigue are minimized. While the expansion of PTFE does make the polymer less dense and thereby less stiff, continuous flexure of the crystalline fibrils may cause the fibrils to break rendering the material unsatisfactory for a variety of applications.

It is thus desirable to invent a novel PTFE polymer such that these problems are resolved.

BRIEF DESCRIPTION OF THE INVENTION

The invention described herein is an amorphous polytetrafluoroethylene or PTFE polymer that exhibits consistent strength in more than one direction, resists cold flow or creep, and demonstrates good flexural fatigue resistance. The preferred invention is a single layer of PTFE polymer orientated such that consistent strength is exhibited in more than one direction. As strength and creep resistance characteristics coincide, the preferred invention is resistant to creep in more than one direction. The preferred invention is characterized by consistent multi-axial strength, a density from about 0.2 gm/cc to about 2.0 gm/cc, a porosity from about 5 nanometers to about 200 micrometers, and a crystallinity from about 20% to about 70%.

DETAILED DESCRIPTION OF THE INVENTION

The goal of this invention is to provide a single layer PTFE polymer that exhibits consistent strength in multi-axial directions and is relatively amorphous such that flexural fatigue issues are minimized. This goal is accomplished by a unique and specific process. Polytetrafluoroethylene resin is mixed with an extrusion-aid such as mineral spirits and compressed into a pre-extrusion pellet at relatively low pressure. The pellet is then ram extruded at slow rates with an extruder device through a die. The PTFE resin paste is subjected to relatively high pressure and shear forces within the die such that the PTFE resin paste forms a shaped article. The high pressure and shearing action within the die tends to align the high molecular weight PTFE chains along the longitudinal axis of the extrudate such that longitudinal strength is enhanced and transverse strength is lowered. This uniaxially orientated PTFE polymer is the precursor to the invention herein.

The preferred invention utilizes the extruded uniaxially orientated PTFE polymer described in the paragraph above. The invention is made by a process of multiple orientated passes through a calender device at slow rates and at various temperatures and pressures. The process forces the uniaxially aligned PTFE molecular chains to randomly re-orientate relative one to another. This random-like re-orientation of the PTFE molecular chains renders the PTFE polymer consistently strong in multi-axis directions. The thermodynamic properties of this novel single-layered and random-like orientated PTFE polymer remains amorphous throughout the processing and thereby renders the invention resistant to flexural fatigue. Residual lubricant remaining in the preferred invention following processing is removed at a temperature slightly above the boiling point of the lubricant or about 150° C. and far below the sinterring temperature at which the PTFE polymer is rendered more crystalline or at about 350° C.

The novel structure of the preferred invention consists of a single layered random-like orientated PTFE polymer that is relatively amorphous. The density of the preferred invention can be controlled by the type of PTFE resin used and the ratio of the lubricant to resin in the pre-extrusion pellet. The typical density for the preferred invention is from about 0.2 gm/cc to about 2.0 gm/cc. The porosity of the preferred invention can be determined via scanning electron microscope methods and is typically from about 5 nano-meters average pore size to about 200 micrometers average pores size. Crystallinity or amorphous properties for the preferred invention can be determined with differential scanning calorimetry or DSC. Crystallinity from about 20% crystalline to about 70% crystalline characterizes the preferred invention.

BRIEF DESCRIPTIONS OF THE DRAWINGS

DETAILED DESCRIPTIONS OF THE DRAWINGS

Figure 1:
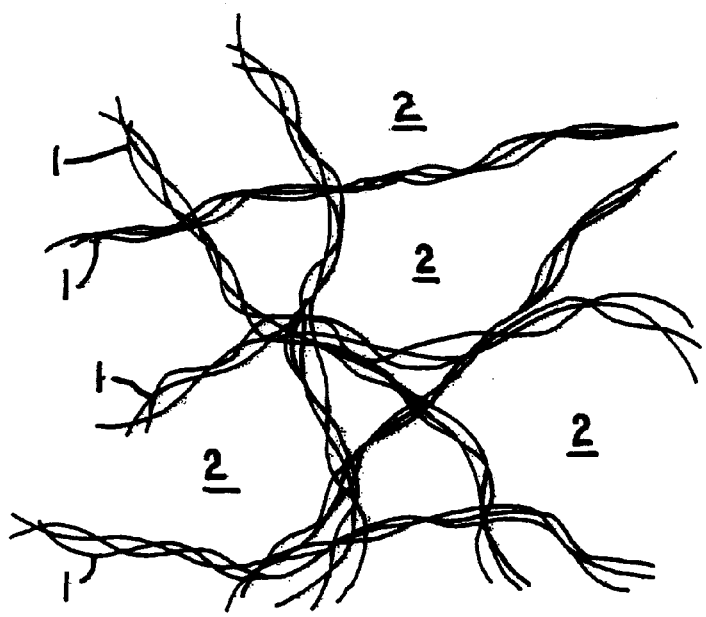
FIG. 1 is a three dimensional view of the preferred invention depicting the random orientation of the PTFE molecular chains.

FIG. 1 shows the long PTFE polymer chains orientated one to another in a random fashion or multi-axial fashion. The PTFE chains 1 consist of a helical polymeric structure of the repeating monomer tetrafluoroethylene or $\{-C_2F_4-\}^n$, with a molecular weight from about 25,000 gm/mole to about 20,000,000 gm/mole, that is typically entangled with other PTFE chains such that multi-helix complexes may result. Voids 2 result between the chains rendering the polymer porous.

Figure 2:
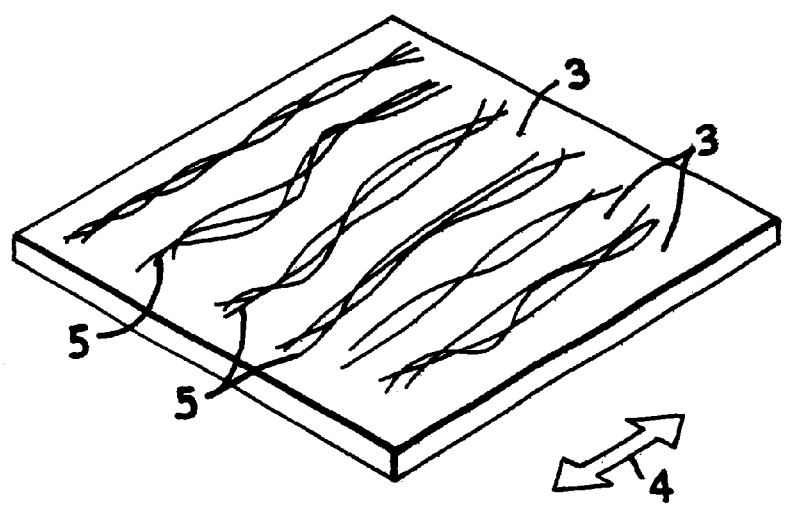
FIG. 2 is a three dimensional view of the precursor PTFE polymer to be made into the invention showing the orientation of the polymer chains along the longitudinal axis.

FIG. 2 shows the precursor PTFE polymer that will serve as the raw material for the invention. The PTFE chains 3 are shown aligned in a somewhat parallel fashion along the longitudinal axis 4 resulting with a uniaxial strength property. Voids are present between the polymer chains 5.

Figure 3:
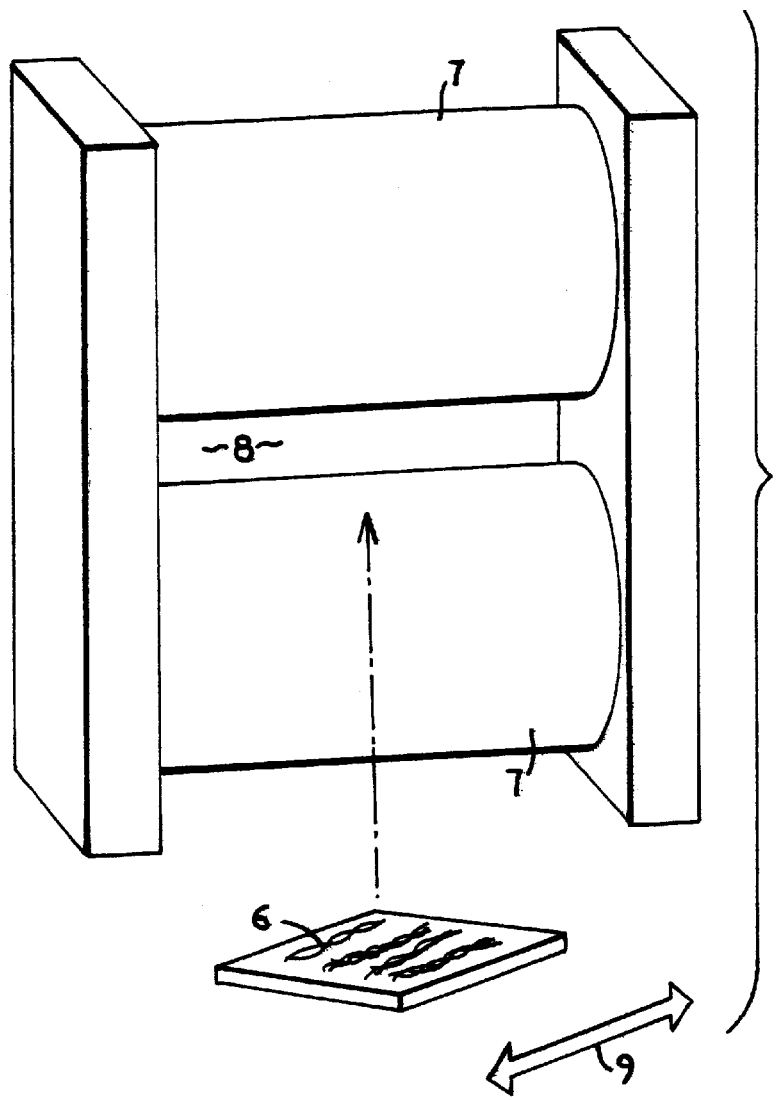
FIG. 3 is a schematic of an apparatus that may be used to produce the invention.

FIG. 3 is a schematic view of the apparatus for manufacturing the invention. Two large rollers 7 are fixed in a parallel fashion such that the gap 8 between them can be adjusted in very small increments. The uniaxial orientated precursor PTFE polymer 6 is rotated such that it is introduced and passed through the roller apparatus at various directions and at about 45 degrees relative to the parallel orientation of the PTFE chains 9 of the precursor PTFE polymer. The gap is lowered in very small increments following each pass such that the PTFE polymer is gradually reduced in thickness.

Figure 4:
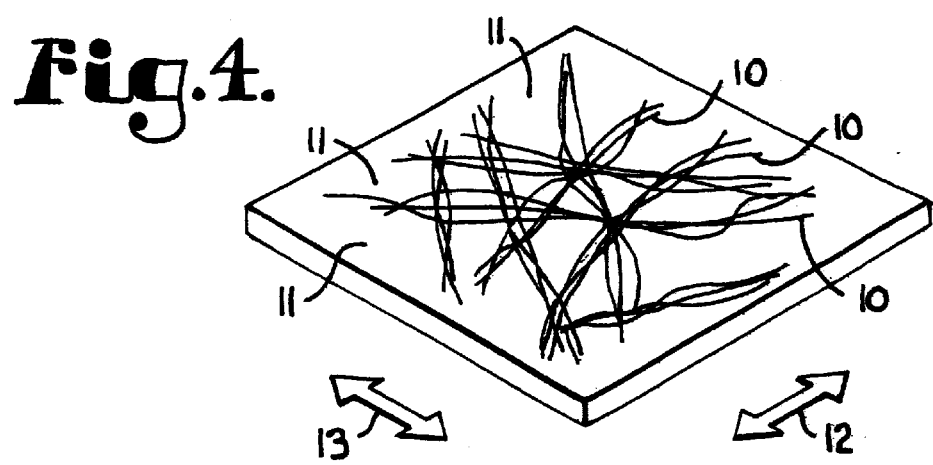
FIG. 4 is a sectional view of the preferred invention depicting the orientation of the PTFE molecular chains and corresponding multi-axial direction of strength.

FIG. 4 is a three dimensional view of the preferred invention. The polymer chains 10 are shown orientated in a random-like or multi-axial fashion one to another. The voids 11 are shown as spaces between the PTFE chains. Multi-axial strength can be measured along both the longitudinal 12 and transverse 13 directions.

EXAMPLE 1

Multi-axial Strength-Orientated PTFE Polymer

Polytetrafluoroethylene resin was mixed with extrusion aid and made into a paste. The paste was made in a pre-extrusion pellet with a ram pelletizer. The pellet was then extruded with high pressure through a die to form a highly chain orientated PTFE tape of about 1 mm thickness. The tape was then cut into squares that were convenient to pass through the calender apparatus. The squares were passed through a calender device multiple passes following a specific entry orientation during which the gap between the rollers of the calender was reduced. The final thickness of the calendered tape was about 0.250 mm. The tape was then dried at 150° C. to remove the remaining mineral spirits and was allowed to cool. The multi-axially strong single layered tape was then tested and the comparative results to uniaxial orientated PTFE polymer is shown in comparison to the precursor PTFE polymer in TABLE 1.

TABLE 1

| Polymer | Density (gm/cc) | Strength axis #1 (psi) | Strength axis #2 (psi) | Variation in strength (%) | Pore size ($10^{-6}$ meters) |
| --- | --- | --- | --- | --- | --- |
| Multi-axial | 1.7 | 1710 | 1652 | 3.4% | 0.4 |
| Precursor | 1.6 | 1329 | 354 | 73.4% | 0.5 |

Table 1 note: Values represent an average of n = 5.

What is claimed is:

1. A multi-axially orientated PTFE polymer consisting of an amorphous polytetrafluoroethylene polymer, wherein said polymer is characterized by a molecular structure of randomly orientated polymer chains and a porosity of from about 5 nanometers average pore size to about 200 micrometers average pore size, the variations of the strength measured in two or more directions being less than 30% of the strongest directional strength.

2. A multi-axially orientated PTFE polymer as described in claim 1 in which the polymer is amorphous exhibiting a crystallinity from about 20% to about 70%.

* * * * *